INVENTOR.
HARRY H. HEYSON

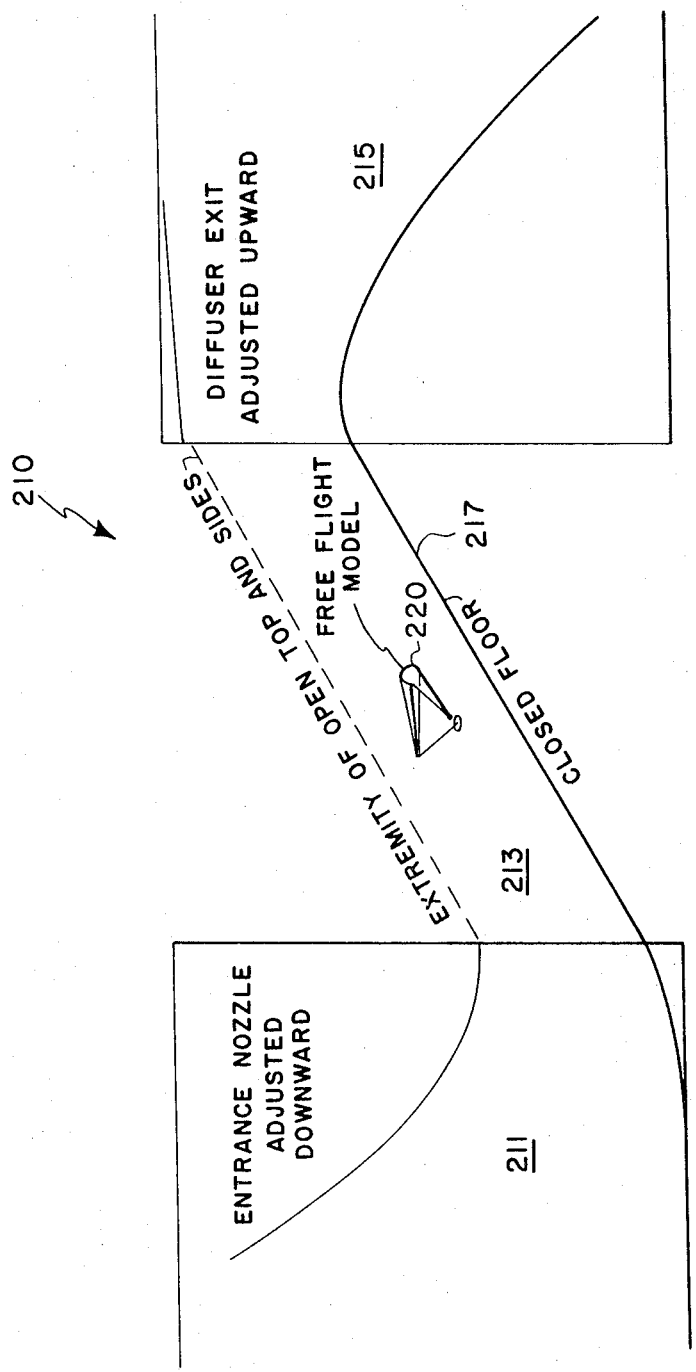

… … …

United States Patent Office 3,620,076
Patented Nov. 16, 1971

3,620,076
VARIABLE GEOMETRY WIND TUNNELS
Harry H. Heyson, Hampton, Va., assignor to the United States of America as represented by the Administrator of the National Aeronautics and Space Administration
Filed Oct. 20, 1969, Ser. No. 867,841
Int. Cl. G01m 9/00
U.S. Cl. 73—147     4 Claims

ABSTRACT OF THE DISCLOSURE

Variable geometry wind tunnels that will greatly reduce the effect of the wind-tunnel boundaries on the data obtained in subsonic tests representing the low-speed phases of flight. In one embodiment the model in the tunnel is appropriately adjusted by a system governed by a computer. In another embodiment the width-height ratio of the tunnel is adjusted by a computer.

ORIGIN OF INVENTION

This invention was made by an employee of the National Aeronautics and Space Administration and may be manufactured and used by or for the Government of the United States without the payment of any royalties thereon or therefor.

This invention relates generally to variable geometry wind tunnels and relates in particular to a system for reducing the corrections needed in data obtained in subsonic wind tunnel tests representing the low speed phases of flight.

The effect of the wind-tunnel boundaries, as shown in many prior studies, can be expressed approximately as $$\tan \Delta\alpha\delta = \frac{A_m}{A_T} \frac{L}{\frac{\rho}{2}V^2 S}$$

or as similar roughly equivalent forms, where $\Delta\alpha$ is the effective change in angle of attack caused by the vertical interference velocity resulting from the model lift.
$\delta$ is a constant particular to the tunnel geometry and model position and the degree to which the model wake is deflected in order to obtain lift.
$A_m$ is an appropriate reference area of the model.
$A_T$ is the cross-sectional area of the wind tunnel.
$L$ is the model lift.
$\rho$ is the mass density of the test medium which may be air, water, Freon or other substances.
$V$ is the wind-tunnel velocity and
$S$ is the wing or disk area of the model.

When testing at very low speeds the model, which influences a mass of air per second which is proportional to $V$, must deflect the wake downward very sharply in order to obtain its lift. As noted in NASA TR R–124, this deflection severely affects the factor $\delta$. In addition as $V$ decreases, it will be noted that $\Delta\alpha$ increases very rapidly. It has been the past practice to either ignore the effect on the data, with consequent effect on the accuracy of the data, or to apply large corrections based upon theoretical considerations. The present invention is intended to reduce these wind-tunnel boundary effects to essentially zero so that they may be safely ignored.

It has been noted that for a wind tunnel with a closed lower boundary and open upper and side edges, the interference factor $\delta$ becomes zero for one wake deflection angle which is a function of either the height of the model above the floor or of the width-height ratio of the wind tunnel. Furthermore, this wake deflection angle is predeterminable from theoretical considerations. Thus, a required schedule of either width-height ratio or model height can be calculated in advance of testing.

Accordingly, it is an object of the present invention to provide a variable geometry wind tunnel for testing aircraft models in subsonic tests representing the low speed phases of flight.

Another object of the present invention is a system for varying the test section of a wind tunnel during a test.

A further object of the present invention is a system for reducing the corrections needed in data obtained in subsonic wind tunnel tests.

Another object of the present invention is a computerized system for attaining optimum test conditions in a low speed wind tunnel test.

The foregoing and other objects are attained in one aspect of the present invention by providing a wind tunnel whose boundaries are closed on the bottom but open on the other three sides, of fixed width-height ratio, but with a model mounting system that allows alterations in the model height above the closed floor with the model height desired being selected by a computer. The computer calculates the model wake deflection angle and then positions the model according to a predetermined schedule of height versus wake deflection angle, thus reducing the wind tunnel boundary effects to a minimum.

Another embodiment of the present invention involves a wind tunnel closed on the bottom but open on the other three surfaces, with fixed model height but adjustable width-height ratio obtained by simultaneously adjusting the entrance nozzle, the floor, and diffuser exit of the tunnel. As in the first embodiment, a computer is utilized to sense the aforementioned qualities, and adjusts the width-height ratio of the wind tunnel according to a predetermined schedule. More detailed theoretical results of the invention may be found in NASA Technical Report TR-R318.

A more complete appreciation of the invention and many of the attendant advantages thereof will be more readily appreciated as the same becomes better understood by reference to the following detailed description when considered in connection with the accompanying drawings wherein:

FIG. 3 is a schematic representation of a third type variable geometry wind tunnel according to the present invention.

Figure 1:
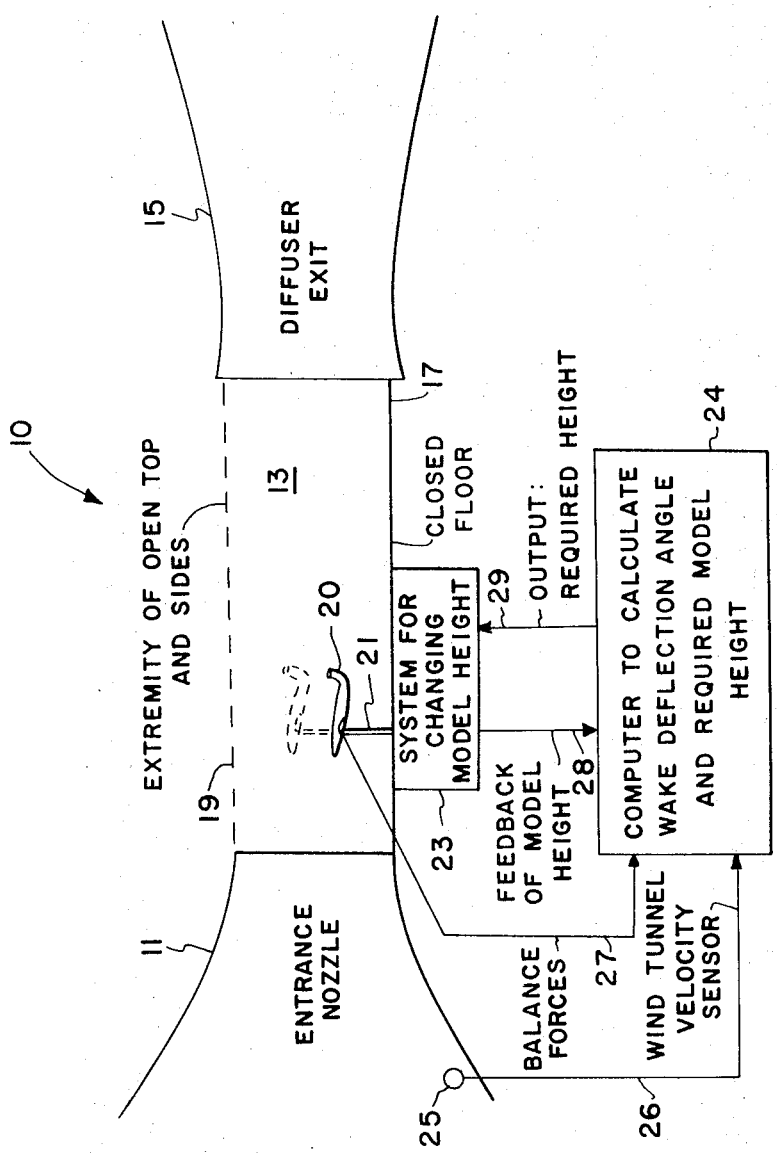
FIG. 1 is a schematic representation of the test section in a variable geometry wind tunnel test system according to one aspect of the present invention.

Referring now to the drawings and more particularly to FIG. 1, there is shown a schematic diagram of a wind tunnel according to the present invention and generally designated by reference numeral 10. Wind tunnel 10 includes a nozzle entrance 11, test section 13, and diffuser exit section 15. Test section 13 is provided with a closed floor 17 and open sides and open top. The extremity of the open top and sides is represented by broken line 19.

A test model 20 is positioned within test section 13 on sting 21 leading to a conventional system for changing model height and as designated by reference numeral 23. The model height changing system 23 is in operative connection with a computer 24. The wind tunnel velocity is detected through the velocity sensor 25 and fed into computer 23 as represented by line 26. Similarly, the balance forces from conventional balances located on model 20, and not shown, are fed into computer 23 as represented by line 27. Using these quantities, the computer calculates the model wake deflection angle and positions model 20 according to a predetermined schedule of height versus wake deflection angle thus reducing the wind tunnel boundary effects to a minimum. The mechanism for mounting model 20 and the system 23 for adjusting model height may be of any conventional construction. Computer 23 may be digital, analog, electronic, fluidic or mechanical and functions with height adjustment system 23 by detecting feedback of model height, as represented by line 28, and feeding output of the required height to the height adjustment system 23 as represented by line 29.

Figure 2:
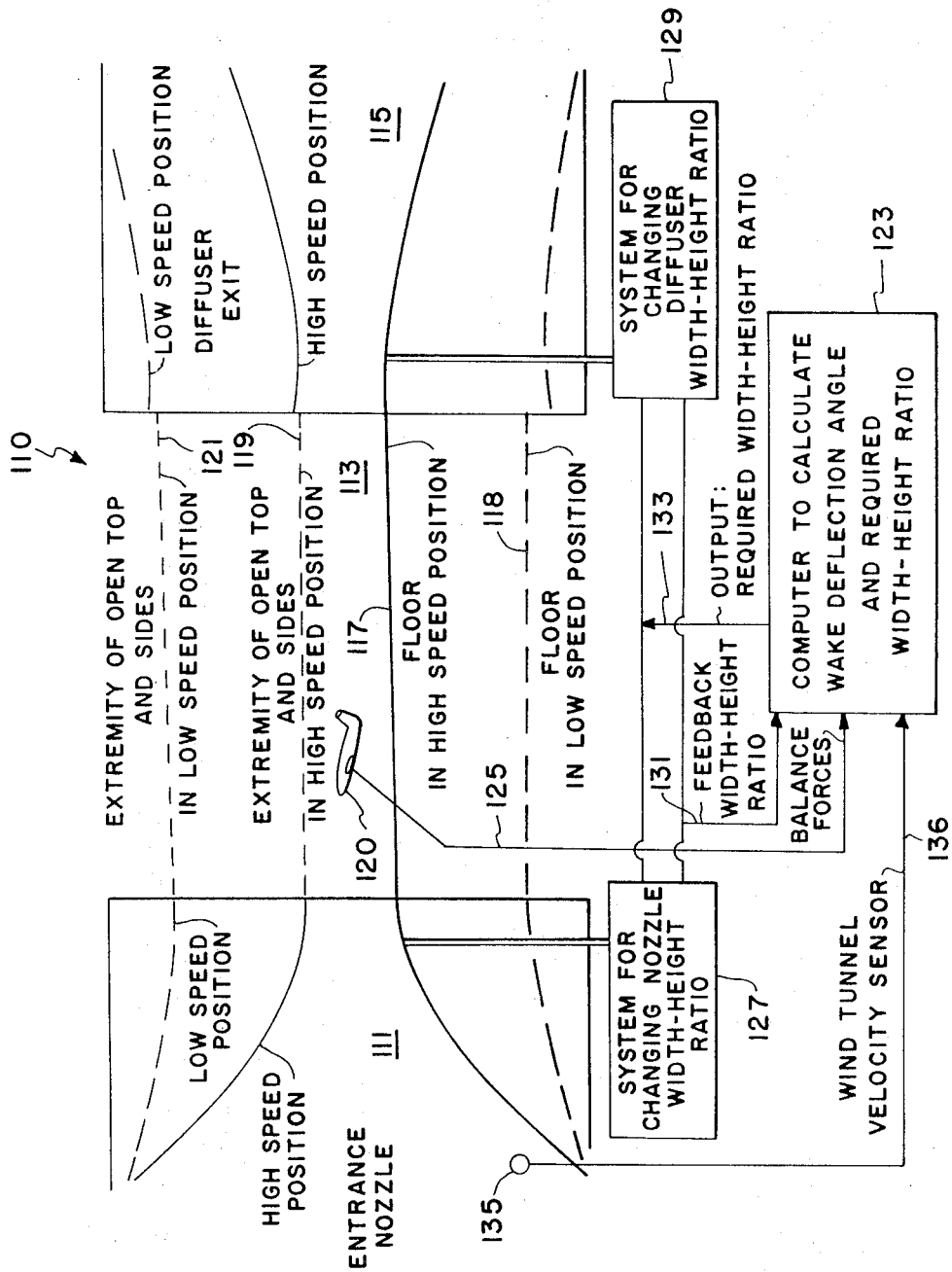
FIG. 2 is a schematic representation of another embodiment of the test section in a variable geometry wind tunnel test system according to the present invention.

Referring now to FIG. 2, a schematic diagram of a second embodiment of the present invention is shown with the wind tunnel generally designated by reference numeral 110. Wind tunnel 110 includes a nozzle entrance 111, test section 113 and diffuser exit 115. Test section 113 is provided with a closed floor as represented by solid line 117 and open sides and top. Floor 117 is adjustable in height, as will be more fully explained hereinafter, with the solid line 117 representing the floor position for high speed testing and broken line 118 representing the floor position for low speed testing. The extremity of the open top and sides for high speed testing is represented by broken line 119 while the extremity of the open top and sides is represented by reference numeral 121 for low sped testing. A test model 120 is positioned within test section 113 on a suitable fixed sting, not shown. As in the previously described embodiment, a computer 123 is utilized to calculate the model wake deflection angle and the required width-height ratio for a particular test. The balance forces from conventional balances on model 120 are fed to computer 123 as represented by line 125. Width-height adjustment is responsive to computer 123 and is accomplished in the present embodiment through any suitable mechanical, electrical, hydraulic, or similar mechanism, with the system for changing the nozzle width-height ratio being represented by block 127 and the system for changing the diffuser width-height ratio being represented by block 129. The feedback from systems 127 and 129 to computer 123 is represented by line 131 while the output from computer 123 to systems 127 and 129 is represented by line 137. The wind tunnel velocity is detected through the velocity sensor 135 and fed into computer 123 as represented by line 136. The operation of this embodiment is now believed apparent. Model 120 is positioned in its fixed height with the balances thereon being connected to computer 123. Similarly, velocity sensor 135, system 127 for changing nozzle width-height ratio and system 129 for changing diffuser width-height ratio are also connected to computer 123. The adjustable width-height ratio wind tunnel 110 requires that the ratio of width to height be reduced as the speed of the tunnel is increased and wake deflection consequently increased. Thus, the width-height ratio is adjusted by simultaneously operation of systems 127 and 129 to move the floor and ceilings of the entrance nozzle and diffuser exit and the cross-sectional area of the wind tunnel test section will, accordingly, increase as the width-height ratio decreases. This effect aids in reducing any residual corrections still further as can be noted from the equation described hereinbefore. In addition, the tunnel of the present invention is smallest at high speeds or low wake deflection and largest at low speeds or high wake deflection. Consequently, such a tunnel is more economical of tunnel power than a fixed geometry wind tunnel providing both high speed and the large size required for very low speed testing.

As shown more clearly in FIG. 3, wind tunnel 210, substantially identical to tunnel 110 shown in FIG. 2, has an additional advantage in that the same mechanism employed in the embodiment of FIG. 2 can be arranged to adjust entrance nozzle 211 and diffuser exit 215 simultaneously, but differentially, to use the test section 213 with an inclined stream. In this embodiment closed floor 217 is inclined due to the adjustments to nozzle 211 and diffuser 215 which are movable therewith. The inclined stream produced in test section 213 permits free flight testing of gliders and unpowered models by using the component of gravity along the stream axis to overcome drag. An exemplary model 220 is shown flying in test section 213. Wind tunnel 210 also utilizes a computer and height adjustment mechanism for nozzle 211 and diffuser 215 as in the previously described embodiment but not shown here in the interest of clarity.

It is thus seen that the present invention provides a unique variable geometry wind tunnel that is very efficient for testing at subsonic speeds wherein model wake deflection has previously presented problems in correction of the data obtained. It is to be understood that the invention described herein is applicable only to subsonic speeds and where the expressions "low speed" and "high speed" are used that they refer to speeds within the subsonic range only and are not intended to imply that these tests could be performed at transonic, supersonic or hypersonic speeds under which conditions the effects of the wind tunnel boundaries are fundamentally different than those discussed herein.

There are obviously many variations and modifications of the present invention readily apparent to those skilled in the art in the light of the above teachings. It is therefore to be understood that within the scope of the appended claims that the invention may be practiced otherwise than as specifically described.

What is claimed as new and desired to be secured by Letters Patent of the United States is:

1. A variable geometry wind tunnel for subsonic wind tunnel tests of an aerodynamic model wherein wind-tunnel wall effects on the resulting test data are minimized, comprising:
   a wind tunnel having a nozzle inlet, diffuser outlet and a test section disposed between said inlet and outlet,
   mounting means for positioning a test model within said test section,
   a test model mounted on said mounting means,
   velocity sensing means within said nozzle inlet,
   balance sensing means on said test model for sensing balance forces thereon during a test,
   an automatic height changing system secured to said mounting means for adjusting test model height during a test,
   computer means for calculating model wake deflection angle and required model height during a test,
   means feeding wind velocity from said velocity sensing means, balance forces from said balance sensing means and model height position to said computer means, and
   means feeding an output function from said computer means to said height changing system when said computer means determines model height changes are required to essentially reduce the wind tunnel boundary effects on the test model to essentially zero.

2. The wind tunnel of claim 1 wherein said tunnel test section comprises a closed floor and is open at the top and sides.

3. A variable geometry wind tunnel for minimizing wind tunnel boundary effects on a test model to essentially zero, comprising:
   a wind tunnel having a nozzle inlet, diffuser outlet and a model test section disposed between said inlet and said outlet, mounting means for positioning a test model at a fixed height within said test section,
a test model mounted on said mounting means,
velocity sensing means for sensing velocity within said nozzle inlet,
balance sensing means on said test model for sensing balance forces thereon during a test,
means for changing the nozzle width-height ratio,
means for changing the diffuser width-height ratio,
computer means for calculating model wake deflection angle and nozzle and diffuser width-height ratio,
means feeding wind velocity from said velocity sensing means, balance forces from said balance sensing means, and width-height ratio from said means for changing the nozzle and diffuser width-height ratio, and
means feeding an output function from said computer means to said means for changing nozzle and diffuser width- height ratio when said computer means determines changes are needed in the nozzle or diffuser width-height ratio when said computer means deter- the test model to essentially zero.

4. The wind tunnel of claim 3 wherein said tunnel test section comprises a closed floor and is open at the top and sides.

References Cited
UNITED STATES PATENTS

| | | | |
|---|---|---|---|
| 1,968,382 | 7/1934 | Fales | 73—147 |
| 2,331,304 | 10/1943 | Carmody | 73—147 |
| 2,791,240 | 5/1957 | Storms | 73—147 |

LOUIS R. PRINCE, Primary Examiner

D. E. CORR, Assistant Examiner